United States Patent

[11] 3,633,547

| [72] | Inventors | Roger H. Stevens;<br>Bruce A. Blair, both of New York, N.Y. |
|------|-----------|---|
| [21] | Appl. No. | 879,194 |
| [22] | Filed | Nov. 24, 1969 |
| [45] | Patented | Jan. 11, 1972 |
| [73] | Assignee | International Farm Systems, Inc.<br>New York, N.Y. |

[54] SYSTEM FOR FEEDING AND MAINTAINING ANIMALS IN A CONFINED ENVIRONMENT
20 Claims, 10 Drawing Figs.

[52] U.S. Cl............................................. 119/16, 119/28
[51] Int. Cl........................................... A01k 01/00
[50] Field of Search............................. 119/16, 20, 22, 28, 15, 51

[56] References Cited
UNITED STATES PATENTS

| 3,042,000 | 7/1962 | McMurray et al. | 119/20 |
| 3,148,662 | 9/1964 | Morrell | 119/16 X |
| 3,191,577 | 6/1965 | McMurray | 119/16 |
| 3,261,324 | 7/1966 | Conover | 119/16 |
| 3,283,744 | 11/1966 | Conover | 119/16 |
| 3,292,584 | 12/1966 | Brodrick | 119/51 R |

*Primary Examiner*—Hugh R. Chamblee
*Attorney*—Curtis, Morris & Safford

ABSTRACT: A system for maintaining and feeding animals in a confined environment wherein a structure is provided having a plurality of tiers with each tier being partitioned into a plurality of animal confinement pans. The floors of each pen are of an open grillwork to allow a controlled flow of ambient ventilation air to flow upwardly through the pen and into the pen in the tiers above, and a portion of each pen is set aside to collect the animals' excrement. The collected animal excrement is flushed by a flowing water system into a collecting trough and returned to a central collecting trench where it is processed by promoting a bacteria and fungi action to convert the animal waste into a useable protein supplement which is added to the animals' food supply. The supply, i.e., a slurry mixture of bean and/or corn meal and the protein supplement derived from the reprocessed animal waste is pumped by a central distributing pump and distributed into troughs disposed adjacent each of the animal confinement pens where it is made continuously available to the animals. In addition, a dome-shaped covering is provided over the tiered structure including a ventilation system which automatically maintains proper temperature and humidity levels within the enclosure at all times and provides for proper airflow within the enclosure so that each pen on each tier is properly ventilated at all times.

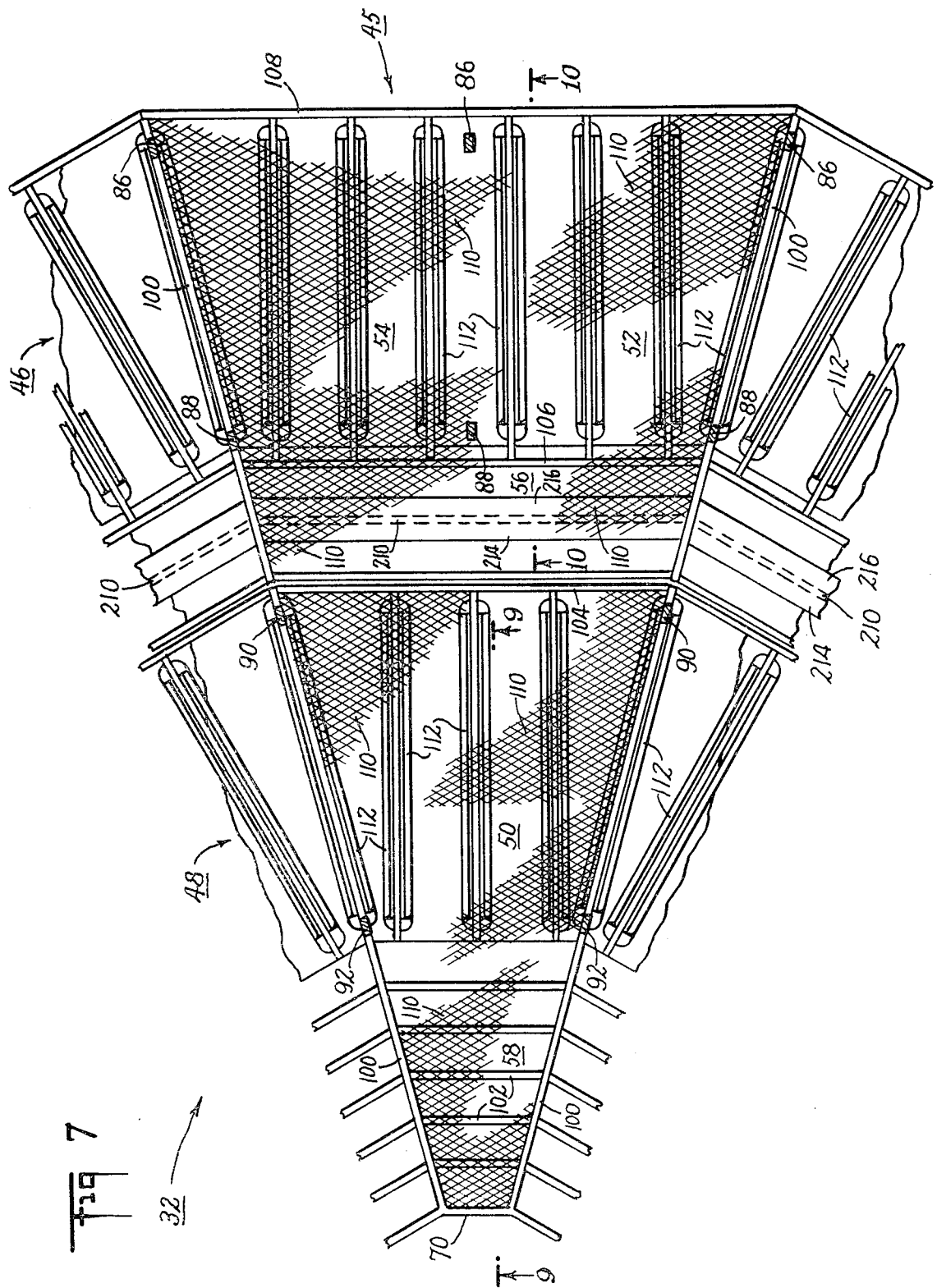

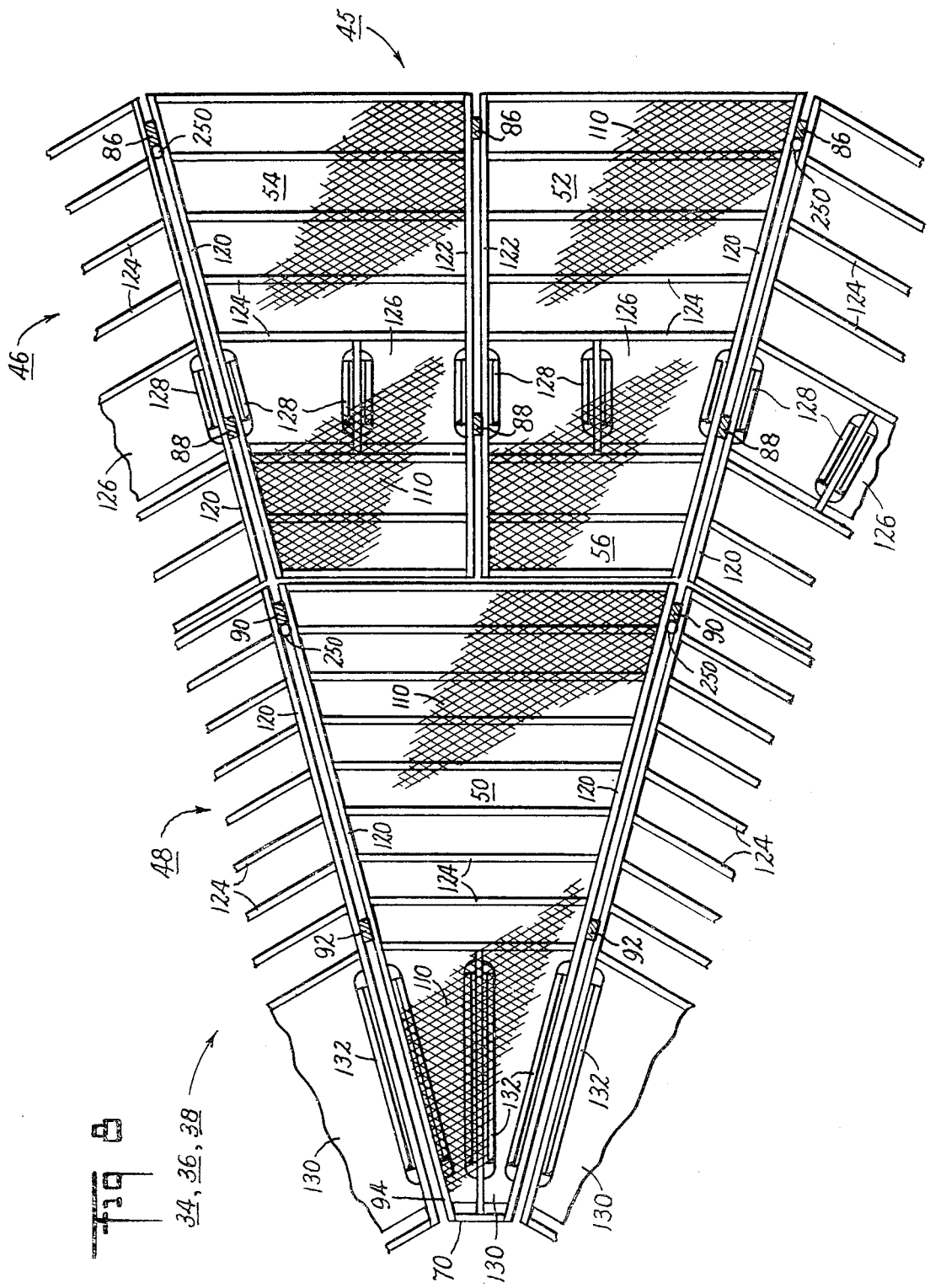

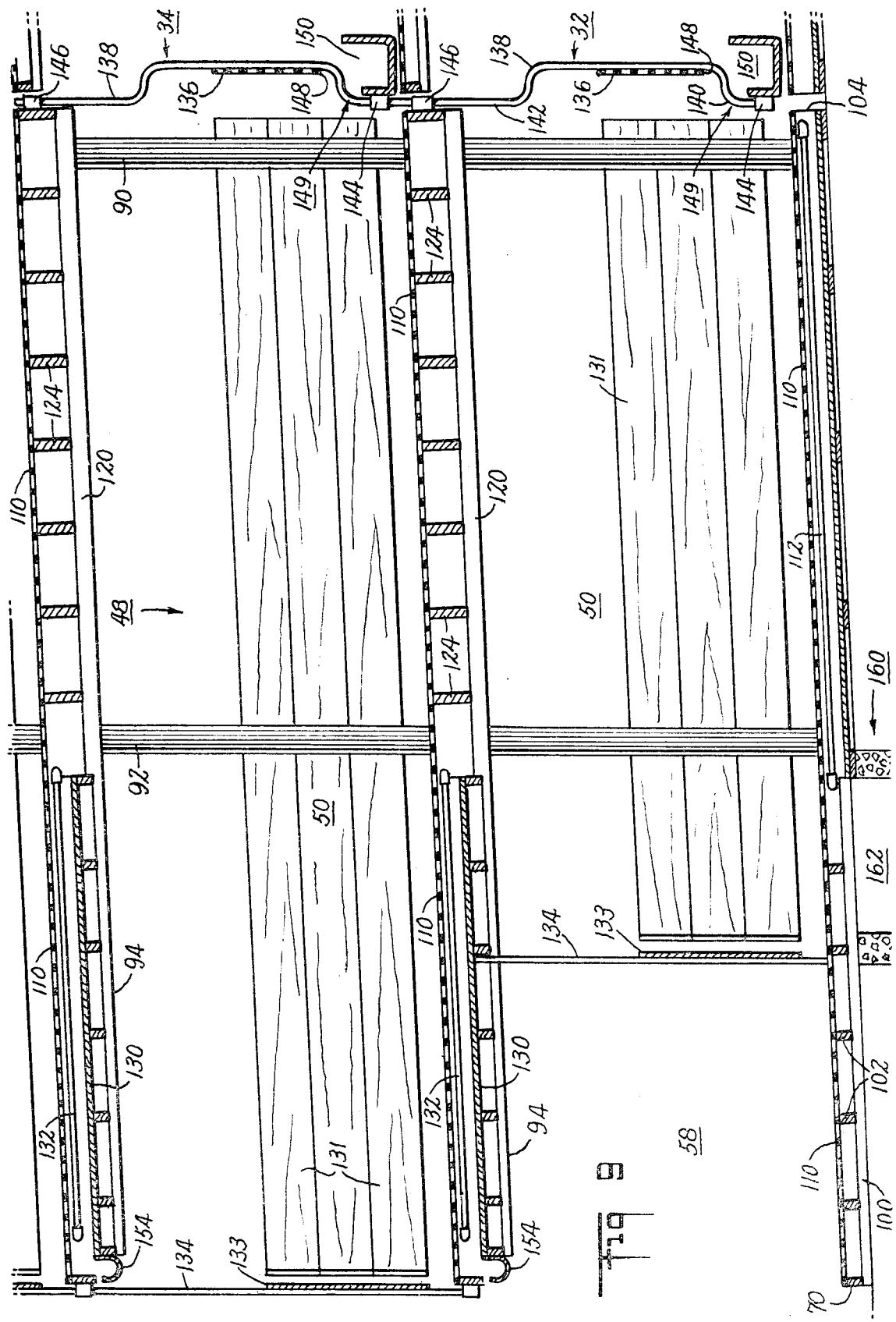

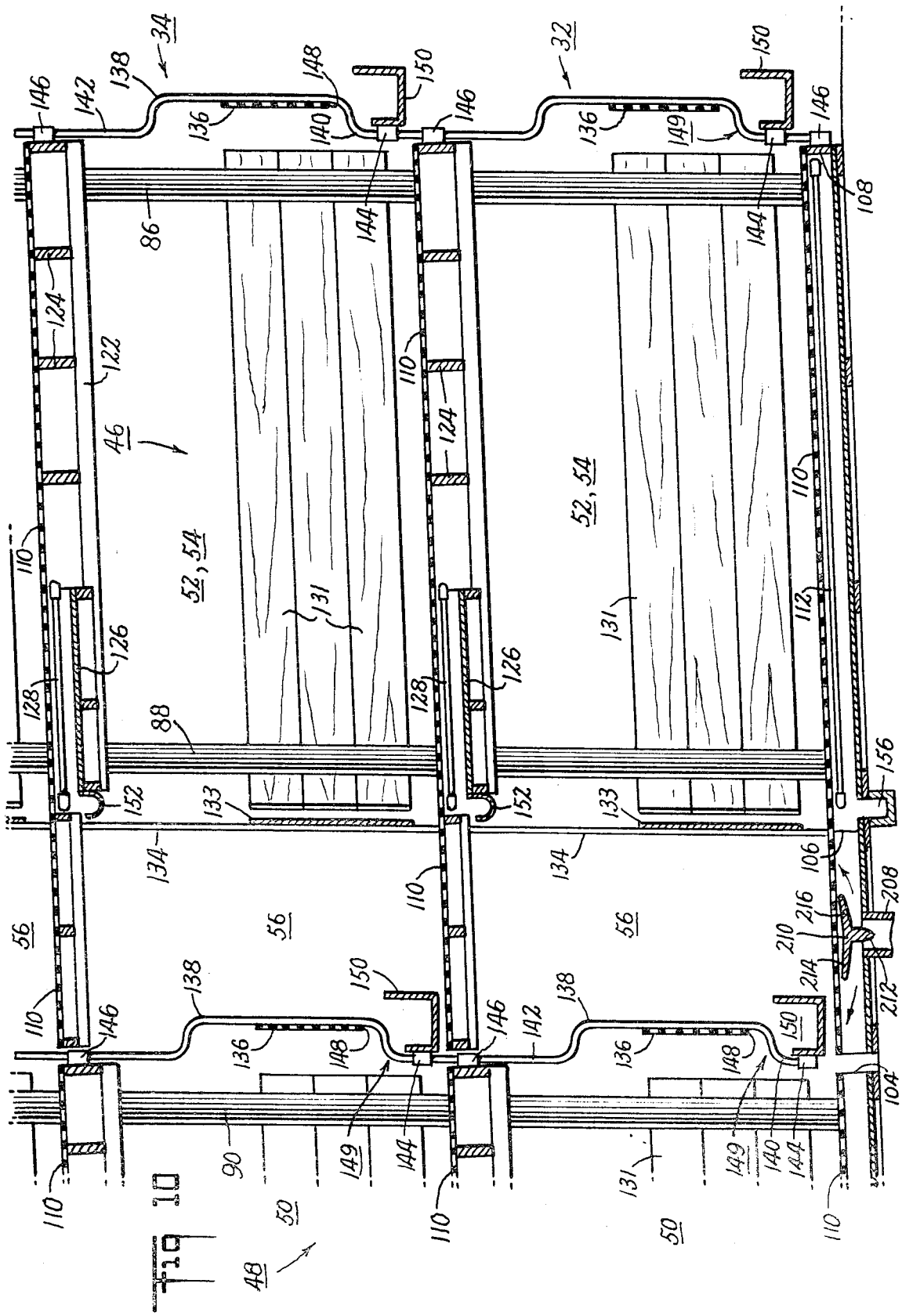

SYSTEM FOR FEEDING AND MAINTAINING ANIMALS IN A CONFINED ENVIRONMENT

This invention relates to a system for maintaining and feeding animals in a confined environment and more particularly to a unique building structure combined with an automatic food distribution and waste recovery system to provide a fully automated confined housing and feeding system for animals.

Today, the problem of feeding a continuously increasing population, made more difficult by the concurrent shifting of population densities from rural agricultural areas to urban centers, has accentuated the necessity for increasing the productivity of those still engaged in farming and the raising of livestock for human consumption. Because of this twofold requirement, i.e., producing ever-increasing quantities of food and livestock for consumption by a rapidly increasing population and increasing the productivity of individual farmers to offset the decrease in the number of individuals engaged in farming, it has become critically necessary to develop farming procedures and techniques to increase productivity in order to meet the increasing demands. While great strides have been made in increasing productivity of farming operations so that the yield per acre of farmland under cultivation has steadily risen throughout the years, no equivalent gain in productivity has been obtained in the raising of livestock such as cattle, sheep and swine for human consumption.

Heretofore, the raising of livestock such as cattle, sheep and swine for human consumption has been carried on mainly by grazing the animals in open fields until they are of a suitable weight to be sent to market or, in the case of swine, raising the swine in somewhat more confined quarters in pens accessible to a food supply for the swine. In any event, productivity has not been particularly high because overall systems management for the raising of livestock, particularly swine, has been poor, animal confinement structures have suffered from poor ventilation and problems in disposing of animal waste in a sanitary and efficient manner which all result in inordinately high costs.

Confined animal housing systems have been proposed heretofore, but such systems have not found wide acceptance because they have not provided a market increase in productivity while lessening the direct manual labor involved in housing and caring for the animals.

Accordingly, it is an object of the present invention to provide a system capable of fattening great numbers of animals in a confined environment with a high degree of productivity and efficiency of operation.

It is a further object of the present invention to provide a system to maintain and feed a large number of animals within a confined enclosure by providing a building structure utilizing a unique pen design, pen locations and incorporating automatic equipment to feed and dispose of the animal waste and to automatically ventilate and maintain the internal atmosphere of the building at an optimum level.

It is yet another object of the present invention to provide a confined animal maintaining and feeding system which requires minimum direct labor to operate thus resulting in a high level of productivity and efficiency.

Still another object of the present invention is to provide a confined animal feeding system utilizing a liquid feed for the animals which is readily and automatically pumped to animal feed troughs to provide the animals with all their necessary food and water requirements without requiring separate watering troughs.

Yet another object of the present invention is to provide for an automatic animal feeding system wherein the manure waste product from the animals is automatically collected and processed to form a yeast which is then added as a protein supplement to the liquid feed which is in turn pumped to the food troughs.

Still another object of the present invention is to provide an automatic system which uses part of the liquid recovered from a manure processing system to flush manure from the animal pens to a central manure processing area.

Still another object of the present invention is to provide a system for pollution control by removing animal wastes quickly from the animal pens, aerating the manure thus removed to eliminate objectionable odorous gases, processing the manure for use as a food supplement rather than sewage, filtering any remaining liquids and sterilizing and deodorizing air entering and leaving the building structure.

Still another object of the present invention is to provide a ventilation system for a confined animal-maintaining structure wherein the temperature and humidity of the air within the structure is automatically controlled for maximum animal comfort to compensate for seasonal variations of the temperature outside of the structure.

Still another object of the present invention is to provide a confined animal feeding and maintaining system which may be prefabricated into modular components prior to installation and assembled readily and easily at a desired site and which may then be readily knocked down and reassembled at a new location.

These and other aspects and advantages of the present invention will become more readily apparent after consideration of the following specification in conjunction with the accompanying drawings. It is to be expressly understood that while the present specification will be described wherein the structure of the present invention is used for feeding and maintaining swine, the structure is also adaptable for other livestock raised for human consumption, such as cattle and sheep.

In the drawings:

FIG. 7 is a plan view of an enlarged segment of the pen structure of the first tier;

FIG. 8 is a view similar to FIG. 7 showing an enlarged segment of the pen structure typical of the second, third and fourth tiers;

FIG. 9 is an elevational view taken on line 9—9 of FIG 7; and

FIG. 10 is a continuation of the elevational view taken on line 10—10 of FIG. 7.

Figure 1:
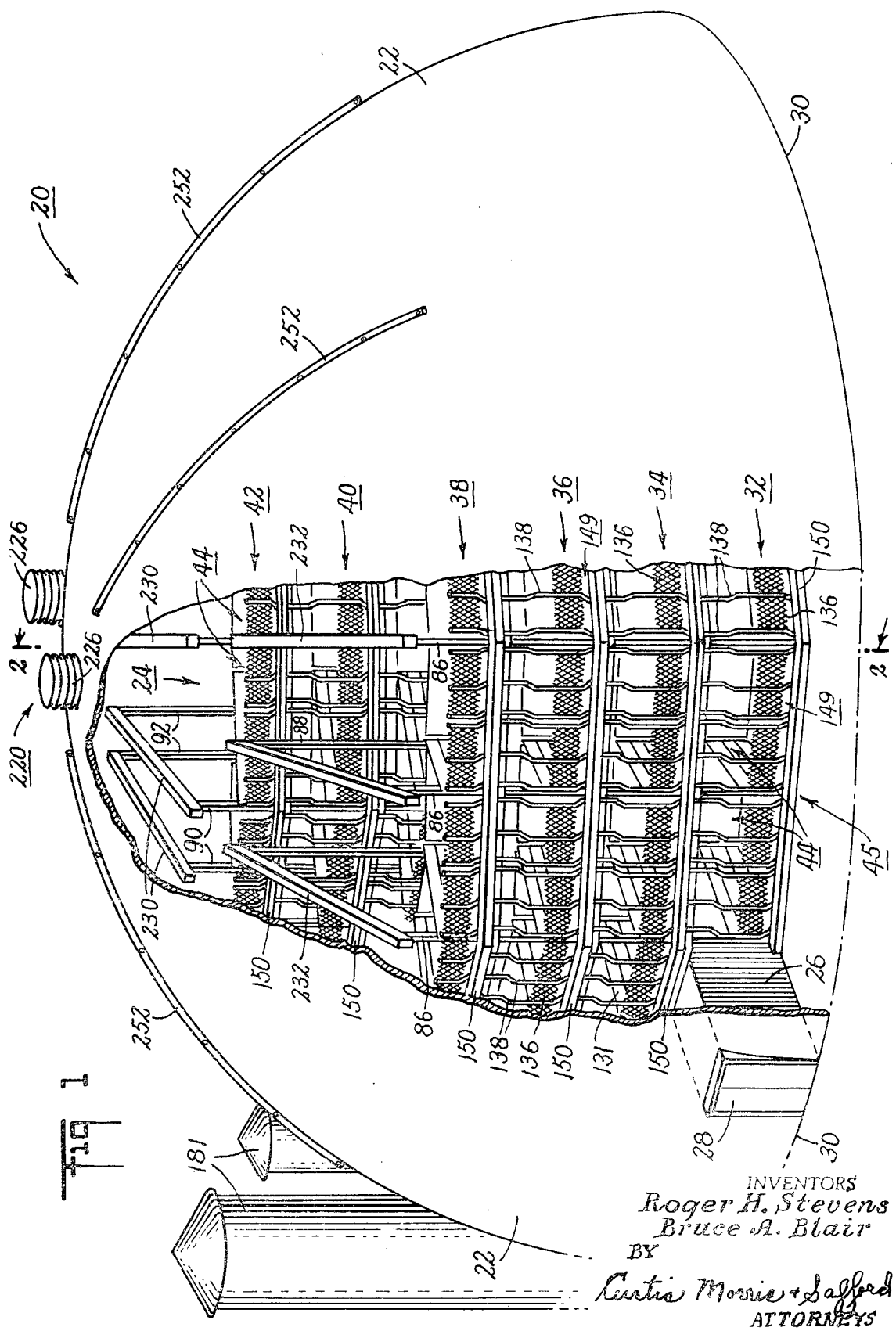
FIG. 1 is an overall perspective view, partly broken away, showing the air-supported dome-shaped structure enclosing a multitiered structure containing a number of animal pens.

With reference now to the drawings and particularly FIG. 1, there is shown a building structure 20 comprising a flexible hemispherically shaped membrane 22 which encloses a multitiered animal housing and confinement structure 24 within. Dome 22 is preferably of a translucent material to allow light to pass therethrough and is adapted to be supported above the inner structure 24 by maintaining a slight degree of air pressurization within. Accordingly, an air lock 26 is provided at the entrance passage 28 of dome 22 and the lower periphery 30 of dome 22 is suitably sealed to the ground so that a slight positive pressure may be maintained within the building structure sufficient to support the flexible membrane of dome 22. Preferably, the animal confinement structure 24 is provided with six tiers or levels 32 through 42 with each tier having 12 major sides in plan and with two upper tiers 40 and 42 having an area appreciably less than the four lower tiers 32 through 38 in order to provide an internal silhouette which more closely approximates the internal contour of the domed enclosure 22.

Each tier 32 to 42 of structure 24 is partitioned into a number of individual animal confinement pens 44 which are provided with automatic food supply means and automatic animal waste disposal systems as will be described more fully hereinbelow.

Figure 2:
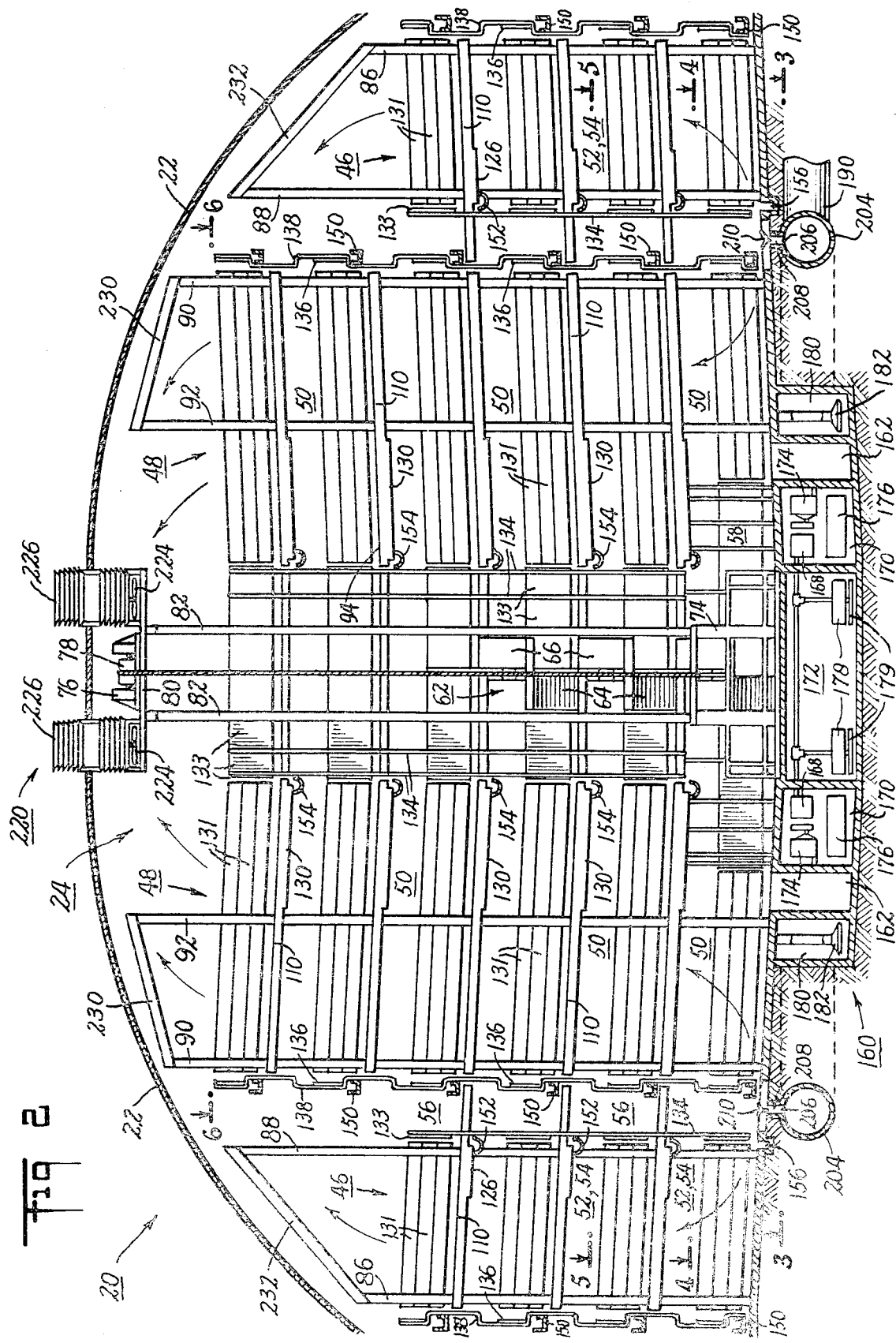
FIG. 2 is a vertical section of the structure taken on line 2—2 of FIG. 1.
Figure 4:
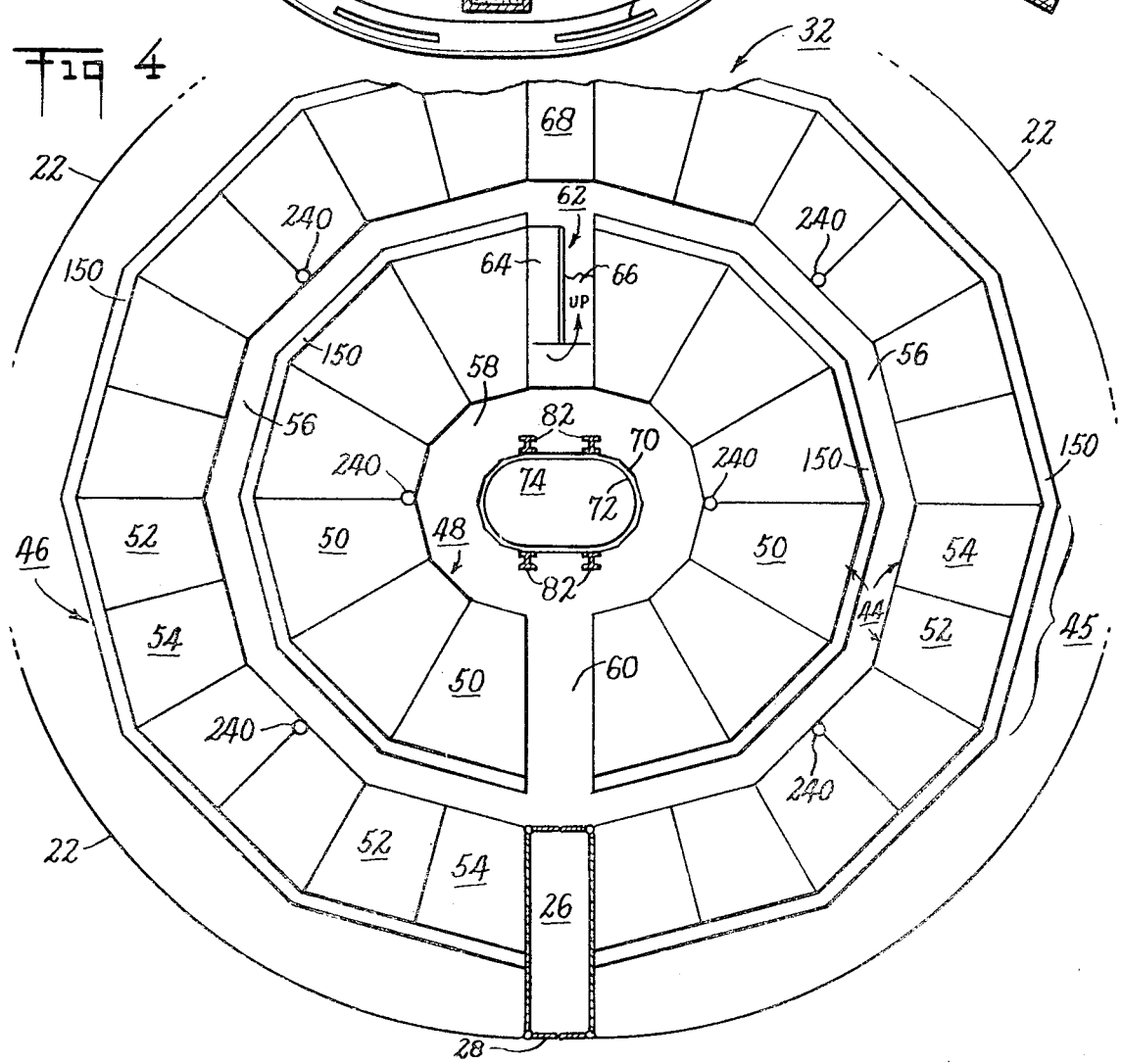
FIG. 4 is a horizontal section taken along the line 4—4 of FIG. 2 showing the first tier of the building structure of the present invention.
Figure 5:
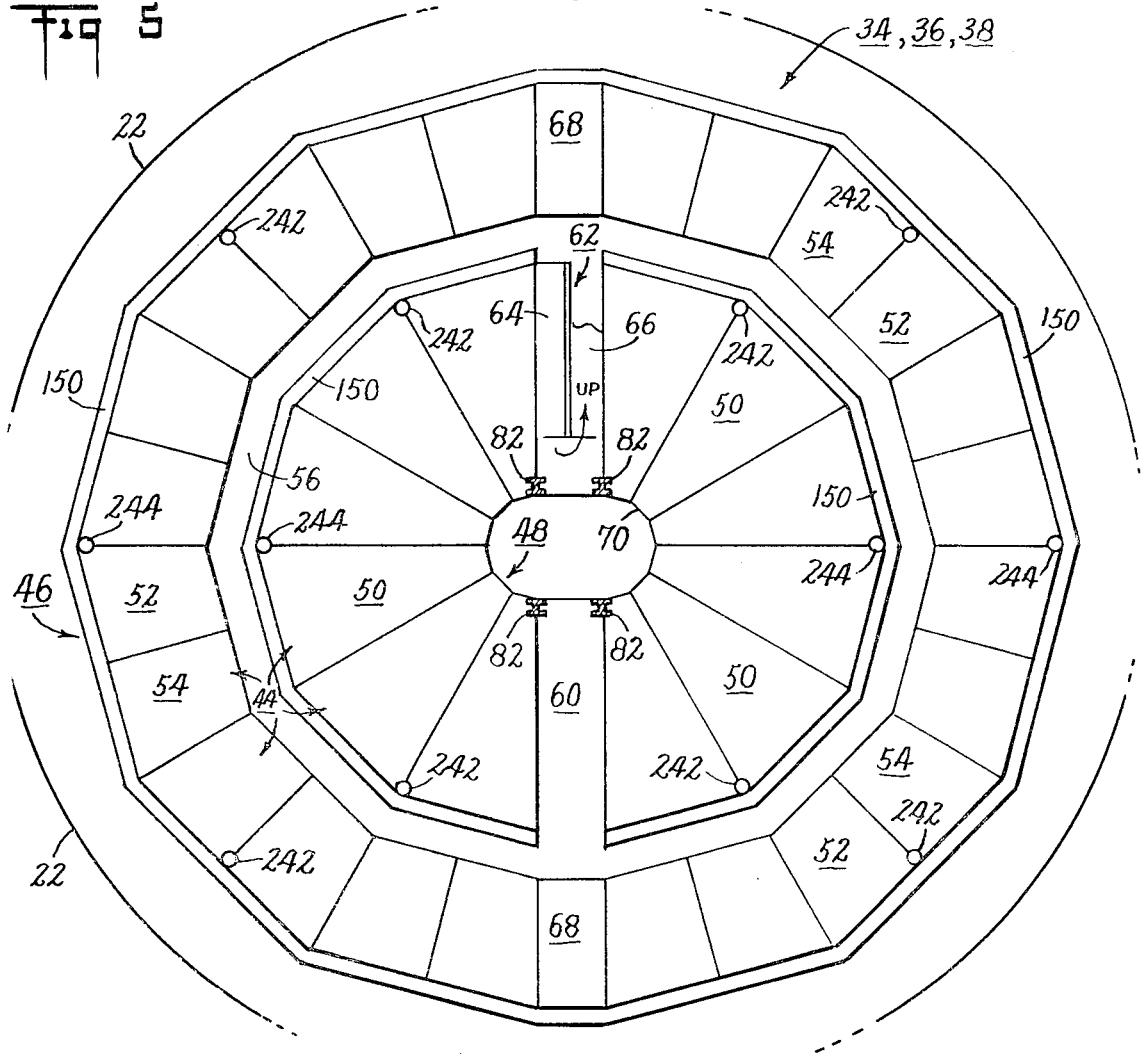
FIG. 5 is a horizontal section taken along the line 5—5 of FIG. 2 showing a typical floor plan for the second, third and fourth tiers of the building structure.
Figure 6:
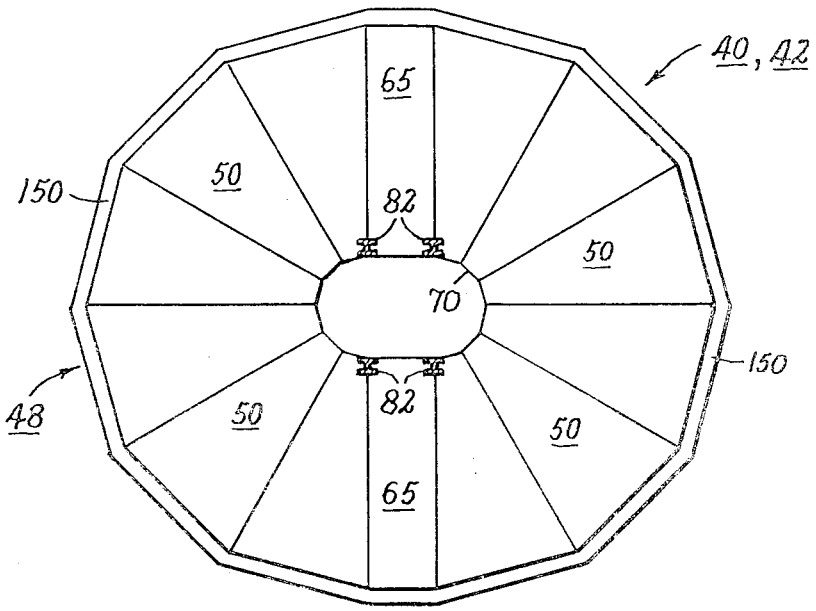
FIG. 6 is a horizontal section taken along the line 6—6 of FIG. 2 showing a typical floor plan for the fifth and sixth tiers of the building structure.

As shown in FIG. 2 as well as in FIGS. 4, 5 and 6, the four lower tiers 32, 34 36 and 38 include an outer ring of pens 46 and an inner ring of pens 48, which pens are substantially identical for each tier except for minor structural modifications for the animal waste disposal system for the pens on the first tier 32. The upper tiers 40 and 42 include only an inner ring of pens 48 and these pens are substantially the same as the inner ring of pens 48 in the four lower tiers.

Each of the animal pens 44 are constructed in modular fashion so that each pen may be preassembled, for example on a production line at a remote location, and then shipped to the site where the confined animal housing unit 20 is to be assembled into the completed structure 24.

As best shown in FIG. 4, which is a diagrammatic plan view of the first tier 32, the modular pens 44 are arranged circumferentially as truncated pie-shaped wedges 45 which are trapezoidal in shape. The pens 50 within the inner ring 48 of animal confinement pens form a single pen at the apex of a pie-shaped wedge 45 and in the outer ring of pens 46 a double pen enclosure 52 and 54 are provided in the wider segment of the pie-shaped wedge 45. The inner ring 46 and outer ring 48 are spaced to provide a walkway 56 between and, similarly, a walkway 58 is provided within the inner ring of pens 48. The passageway from air lock 26 opens into walkway 56 and a walkway 60 is provided from walkway 56 extending inwardly from air lock 26 to the inner walkway 58. Diametrically opposed walkway 60 is a two-stage ramp 62 which inclines upwardly from walkway 56 in the direction of the arrow in a first segment 64 for half the distance between tier 32 and tier 34 and inclines upwardly in a second segment 66 for the remainder of the distance between tiers 32 and 34 to open on the walkway 56 on tier 34. Diametrically opposite the air lock 26 is a rectangular segment corresponding in plan to the rectangular size of the air lock 26 which may be utilized as an additional animal confinement pen if desired but, preferably, may be maintained as an isolation pen for any animal which may require segregation because of sickness from the animals in any other pen.

Inner walkway 58 terminates in an oval-shaped perimeter 70 defining an oval-shaped opening 72 therein and an elevator platform 74 having an oval shaped in plan, closely approximating the oval opening 72 within walkway 58 is provided to afford means to transmit animals from the first level tier 32 to each of the higher level tiers 34 through 42. The elevator platform 74 is driven by a motor 76 (see FIG. 2) driving a pulley system 78 and is supported on a platform 80 above the uppermost tier 42 on four standing beam members 82 disposed adjacent the oval opening 72 in lower tier 32.

Tiers 34, 36 and 38 (see FIG. 5) have a layout similar to tier 32 in that the peripheral ring of pens 46 include dual pens 52 and 54 along the outer edge of a pie-shaped wedge 45, a central walkway 56 and an inner ring of pens 48 as well as walkway 60 from the inner walkway 56 the ramp 62 with the halves 64 and 66 of ramp 62 inclined in the same manner to afford means to walk up to the next higher tier. In the instance of these three middle level tiers, two rectangular isolation pens 68 on diametrically opposed sides of the structure are provided corresponding to the location of the air lock 26 and isolation pen 68 in the first tier 32. The major difference between tiers 34, 36 and 38 is that no inner walkway comparable to walkway 58 is provided so that the inner tier of pens 48 terminate at the periphery of the oval opening 72. Thus, when the elevator platform 74 is on a level with any one of these tiers, communication is afforded into any pen in the inner ring 48. Access to the outer ring of pens 46 is made through walkway 60 to the walkway 56.

With reference now to FIG. 6, which is a diagrammatic plan of the upper tiers 40 and 42, it is noted that the position and orientation of the individual confinement pens in these tiers are substantially the same as the pens in the inner ring of pens 48 in tiers 34, 36 and 38 including the opening 72 of the elevator platform 74 directly into the pens. The major difference in tiers 40 and 42 is that ramp 62 is eliminated on these tiers and since access to the individual pens may be made from the elevator no radiating walkway 60 is needed. Accordingly, the area corresponding to walkway 60 and ramp 62 is utilized as additional rectangular pens 65.

Reference is made again to FIG. 2 wherein it is shown the manner in which the individual modular pens 44 comprising the outer ring 46 and inner ring 48 in each of the tiers are supported one above the other in order to complete the structure 24. As seen in FIG. 2, all of the floor levels of each tier 32, 34, 36, 38, 40 and 42 are inclined slightly from their peripheral extent radially inwardly for purposes as will be explained more fully hereinbelow. The modular pen units comprising the individual pens are stacked one above the other and are supported by upstanding support members 86, 88, 90 and 92, see FIG. 4 as well, where the positions of the vertical upstanding support members are shown. For each pie-shaped wedge 45 of the structure 24 there are provided two upstanding members 92 at the inner corners of the inner trapezoidal wedge of the pen on inner ring 48, two upstanding members 90 are provided at the outer corners of the inner trapezoidal wedge of inner ring 48, three upstanding members 88 are provided on the inner side of the trapezoidal wedge formed by the outer ring of pens 46 and, in like manner, three upstanding members 86 are provided on the outer side of the trapezoidal wedge formed by the outer ring of pens 46. When supported by the upstanding members 86, 88, 90 and 92, the modular pens are supported in cantilever fashion with the outer ring of pens 48 having an extension overhanging the inner support members 88 to form walkway 56 and the inner ring of pens 46 having an extending portion 94 forming the innermost portion of the pen adjacent the elevator opening 72. Because the modular units are supported in cantilever fashion, greater structural integrity of the total structure 24 is maintained without necessitating bulky support members and/or cross brace members.

Reference is now made to FIGS. 7–10 for details of construction of the modular confinement pens 44. FIG. 7 shows a plan view, on a somewhat enlarged scale, of a pie-shaped wedge 45 on the first tier 32 of structure 24. As seen in FIG. 7, the vertical support members 86, 88, 90 and 92 extend vertically through the flooring for the pens. In tier 32 the flooring is supported at an elevation above an inclined subfloor by floor support members 100 extending radially outward from the center of the structure. Suitable cross brace members 102 at the inner end of the pie-shaped wedge 45, cross brace members 104 and 106 along the midportion of the pie-shaped wedge and cross brace member 108 along the outer extent support a grated flooring 110 of an open mesh grillwork which is preferably of expanded metal. Since the flooring in each of the pens 44 is of an expanded metal, light and circulating air passes freely therethrough and yet the grating is of a sufficiently small size so that animals within the pens may be comfortably supported thereon. In the space between the expanded metal flooring 110 in the pens 52,54 of outer ring 46 and the flooring 110 in the pens 50 of inner ring 46 and the subflooring subflooring there are provided a plurality of flush pipes 112 adapted to periodically emit a continuous stream of water beneath the flooring 110 in order to collect any droppings made by the animals through the open grill work of the pen flooring 110. Thus, any matter dropped through the floor 110 is flushed to a central collection area as will be explained more fully hereinbelow. The pipes 112 are connected to a central water distribution supply line (not shown) and is reclaimed after it has been collected at the central point and recirculated with an additional supply of fresh water, if necessary. It is noted that the flush pipes 112 beneath the first tier 32 extend the full length of the pens beneath the animal support flooring 110 in order to prevent an accumulation of debris which may accidentally drop through the open grillwork of the flooring in any pen on one of the upper tiers 34 through 42.

With reference to FIG. 8, which is a plan view similar to FIG. 7 showing a typical floor plan for each of the upper tiers 34 through 42, with the exception that the two upper tiers 40 and 42 comprise only the inner ring of pens 48, it is seen that radially disposed side floor support members 120 are provided which are fixed to the vertical support members 86, 88, 90 and 92 and for the pens 52 and 54 additional radial subflooring members 122 are provided between vertical support members 86 and 88 at the center of the outer portion of wedge 45. Suitably disposed between the radial subflooring support members 120 and 122 are a plurality of spaced cross brace members 124 which, in conjunction with the radially extending floor support members, provide a suitable support for the expanded metal grillwork of the pen flooring 110. In the forward portion of pens 52 and 54, i.e., the innermost portion, comprising the outer ring of pens 46, a trough 126 is provided beneath the flooring 110 which contains a flush pipe system 128 similar to the flush pipe system 112 beneath the total pen floor area in the first tier of pens 32. The flush pipe system 128 and trough 126 collects the animal excrement and waste deposited through the open grillwork of floor 110. In like manner, the inner end of the inner ring of pens 48 is provided with a trough 130 beneath the flooring 110 and a similar network of flush pipes 132 to continuously supply water to wash the animal waste deposited within trough 130 through the open grillwork of the expanded metal flooring 110. Thus, it is seen that for the pens on the lower tiers 32 and on each of the upper tiers, because the flooring 110 is of an expanded metal having an open grill work, light and ventilation air passes readily therethrough in all areas except those areas where the troughs 126 and 130 are located.

At this point it may be well to digress from a description of the structure itself to observe that swine, in particular, possess certain inherent characteristics which makes utilization of the structure of the present invention particularly beneficial. Contrary to popular misconception, swine are fundamentally relatively clean animals and their reputation as being dirty animals, because they are continually wallowing in mud, is not indicative of their true characteristics. Swine wallow in mud because they have no sweat glands and, they do so only to cool themselves. Because swine are inherently clean animals, they have a built-in compulsion to resist defecating and urinating in those areas where they sleep. Hence, if a hog or a pig sleeps in one portion of a pen, it will get up an walk to another portion of the pen in order to urinate or defecate. Accordingly, because the present invention provides a pen structure having a flooring of an open grillwork to allow ventilation air to pass therethrough, and the air may be warmed in winter and cooled in summer, the open areas of the pen provide an atmosphere conducive maintaining the swine in a comfortable condition and, accordingly, they spend the preponderance of their time in this comfort area. Additionally, the food supply for the swine is provided in the open area of the pens and the area for elimination of animal waste is at the lowest elevation of the pen. This increases the tendency of the swine to urinate and defecate only over the designated portion of the pens. When the swine have an urge to urinate and/or defecate, they will do so only in that portion of the pen which is provided with the troughs 126 or 130 immediately below the floor. Because the troughs are provided with a flush pipe system which periodically supplies running water, the waste from the swine is flushed away in the troughs and collected at a central collecting area.

With this explanation in mind, reference is now made to FIGS. 9 and 10 which are somewhat enlarged vertical elevations showing the layout of tier 32 and a typical layout for each upper tier 34–38 with it also being understood that the second level shown in FIG. 9 would be a typical layout for the inner ring of pens 48 in the two upper tiers 40 and 42. It is thus seen that the individual confinement pens are formed by subdividing the pie-shaped wedge 45 into appropriate sized pens.

Illustratively, a plurality of slats 131, which may be of wood or any other suitable material, are fixed to the vertical support members 86, 88, 90 and 92 at a height above the floor level 110 sufficient to confine swine within the pen enclosure. Slats 131, thus form the sides of each pen enclosure with the inner side of each pen enclosure being closed by a gate 133 pivotally mounted on a gate support member 134 to allow the gate to be swung open and closed whenever it is desired to place animals within each pen enclosure. Thus, it is noted that for tier 32 the gate 133 on the inner ring of pens 46 is accessible from the inner walkway 58 adjacent the elevator platform opening 72 and the outer ring of pens 48 is accessible from the intermediate walkway 56. For each of the upper levels 34 through 42, the inner ring of pens 46 have their respective gates 133 placed adjacent the elevator platform opening 72 and, thus, when the elevator is brought to a particular tier, and the gate 133 opened, the animals may be moved directly from the elevator platform to the inner ring of pens 48. Thus, the inner ring of pens 46 in tier 32 are somewhat smaller than the pens immediately above in tiers 34 through 42 as inner walkway 58 is eliminated in these upper tiers and the space occupied by walkway 58 on tier 32 within the pen enclosure itself.

The fourth confining wall of each pen opposite the swingable gate 133 is formed of an open mesh grillwork 136, for example of the type found in a chain link fence, mounted on support stanchions 138 which are provided with inwardly offset lower leg segments 140 and upper leg segments 142. The leg segments 140 and 142 are fixed in leg support members 144 and 146, respectively, and these supports are secured to a suitable frame member of a modular pen in any conventional manner. Since the stanchion supports for the grillwork 136 are spaced apart from each other, and the bottom edge 148 of the grill 136 is elevated with respect to the floor 110, an opening 149 is provided which allows the swine confined within the pen enclosure to extend their heads out beneath the bottom edge 148 of the grill 136 and into a feeding trough 150 mounted adjacent the outer side of each pen enclosure. This also prevents the swine from wallowing in the slurry of the feed troughs or sloshing it about. The feed troughs 150 adjacent the outer ring of pens 46 and the feed trough 150 adjacent the inner ring of pens 48 are all interconnected so that at each tier the feed troughs form two continuous rings. As will be explained more fully below, this allows for a continuous supply of feed in a slurry form to be pumped to each ring of feed troughs 150 to be circulated past all of the confinement pens enabling the animals confined within the individual pens to feed at will and also precludes spoilage of the feed and caking of the feed in the feed supply lines.

The waste collection troughs 126 and 130 are also interconnected to form continuous concentric rings for each of the upper tiers 34–42 and, as seen in FIGS. 9 and 10, the waste collected in trough 126 is flushed by flush pipes 128 down the incline formed by each tier to a collection trough 152 immediately adjacent the inner side of the waste collection trough 126. The water and waste mixture from troughs 152 are collected at suitable spaced locations and returned to a central waste collection area. Similarly, the inner troughs 130 have an overflow trough 154 adjacent the inner edge of the collection trough 130 and the flush water from flush pipes 132 flushes the animal waste and water into the trough 154 where it is also collected at appropriate locations for return to the central waste collection area. The waste removal on the lowest tier 32 is accomplished in a slightly different fashion. All of the subfloor areas in the outer ring of pens 46 acts as a collection trough and flush pipes 112 in this ring of pens extends the full length beneath the flooring 110. The water and waste mixture from this ring of pens drains down the incline of the subfloor toward a collection trough 156 at the inner end of these pens and again, as explained above, is collected for ultimate deposit in a central waste collection area. On tier 32, the forward end of the pens nearest walkway 50 is directly over a subfoundation 160 (see FIG. 3) which subfoundation includes an oval-shaped pit or trench 162 under the flooring 110 at the inner end of the pens in ring 48. Since this trench 162 is directly beneath the open grillwork of flooring 110, the animal waste from the animals confined in inner ring of pens 48 of tier 32 is allowed to drop directly into the trench 162. In addition, flush pipes 112 under the flooring 110 in the inner ring 48 flush waste directly into trench 162. Trench 162 is also the central collection area for the animal waste collected in the outer ring 46 of tier 32 and from all of the troughs 128 and 130 in each of the outer tiers. The animal waste collected in trench 162 is further treated, as will be explained more fully hereinafter, and reprocessed to form a protein supplement which is added to the animals' feed thereby to eliminate the necessity for a sewage system to dispose of the animal waste collected.

Figure 3:
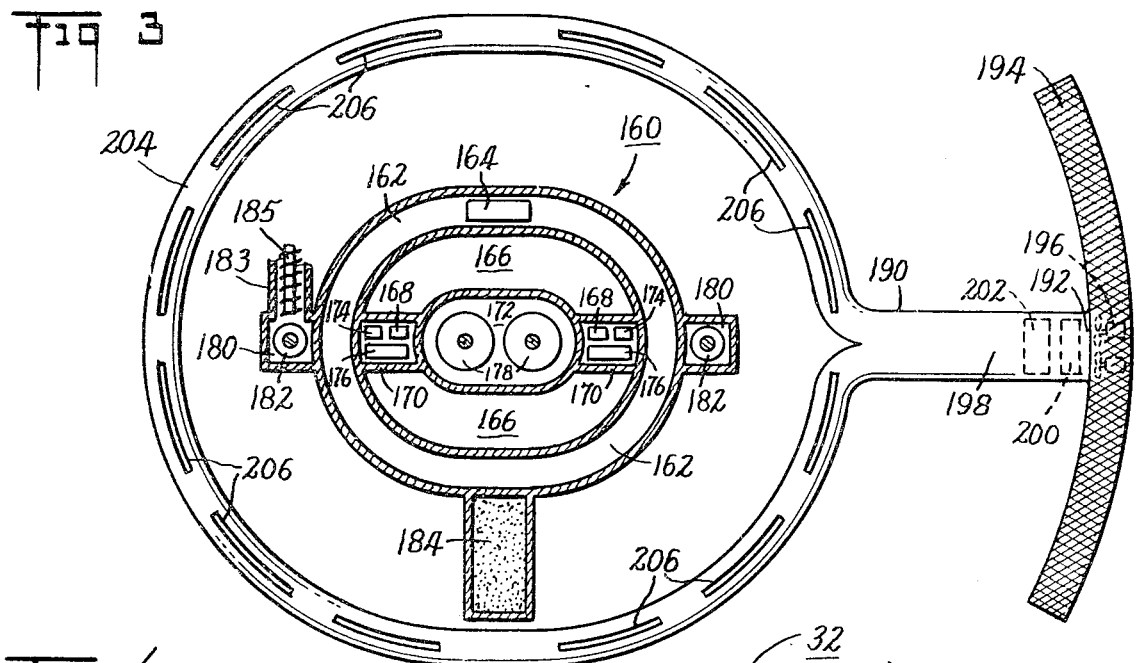
FIG. 3 is a horizontal section taken on line 3—3 of FIG. 2 showing the subterranean foundation of the structure of the present invention.

Reference is now made to FIGS. 2 and 3 particularly to subfoundation 160 disposed centrally of, and immediately below, the first tier 32 of structure 24. Foundation 160 is preferably of concrete and includes an annular oval-shaped trench 162 to receive the raw animal waste collected in troughs 126, 130 and 156 and the waste also flushed directly into trench 162 from lower tier 32. Disposed within trench 162 at an area which may be either below the walkway 60 or below the ramp 62 is an aerator 164 which aerates and agitates the slurry of water and animal waste to eliminate odorous gases prior to passage of the waste into diametrically opposed fermentation vats 166 disposed adjacent the collecting trench 162. Here, the major portion of the water is separated out of the initially processed manure and the waste is pumped by a pump 168 disposed in second-stage processing vat 170 to a yeast tank 172 while the water removed from the system is pumped by water pumps 174 back through the system. The initially processed animal waste passes to the yeast tank 172 where air supplied through airlines 178 in conjunction with paddle agitators 179 (see FIG. 2) agitates the processed manure. A change in the manure composition now takes place due to a bacterial and fungi action and the manure is now converted into a froth having a meringuelike consistency which floats to the top of tank 172. It has been found that this meringuelike by product resulting from the bacterial and fungi action in the raw animal manure is converted into micro-organisms, which may be a yeast. These micro-organisms have great nutritive value and may be readily utilized as a protein supplement to the animal feed. The micro-organisms settle to the bottom of yeast tank 172 and after passing through sterilizer unit 174 are pumped to diametrically opposed feed mixing tanks 180 situated outside of manure-collecting trench 162. In these tanks the high-protein feed supplement is mixed with a corn and/or bean meal and water slurry and it is this slurry mixture which is then pumped by feed pumps 182 in tanks 180 through a delivery system to the feed troughs 150 at each tier level. The corn and/or bean meal is obtained from storage silos 181 (see FIG. 1) and fed to mixing tanks 180 through a supply duct 183 having an augerlike feed screw 185 therein. A trough 184 is also provided which is packed with sand to filter excess water removed from the trench 162, which water is then available for recirculation through the flushing system. The feed tanks are operable to supply one-half of the total system but are also interconnected so that if one is not functioning, the other can supply the total system.

Another aspect of the present invention is the provision of a total environment, fully automated and controlled animal maintenance system. Thus, along with the automated waste removal and processing, the conversion of the waste to a food supplement and the automated distribution of food to the individual animal feeding troughs, a total controlled environment and purification system for the air within enclosure 22 is also provided. Accordingly, the air supply to the building structure, which is slightly pressurized in order to support flexible dome 22, is carefully controlled in order to provide the swine within the enclosure with an optimum environment for all seasons.

Air is supplied to the interior of the structure through an air delivery duct 190 installed below ground level beneath tier 32. Duct 190 has an air access port 192 outside of the dome covering 22 and, preferably, the air access port 192 is located on the north side of the building structure and includes an arcuately disposed intake funnel 194 adjacent the exterior periphery of dome 22. Air entrance port 192 is located centrally of funnel 194 and includes an appropriate fan and blower 196 to force air under slight pressure into main air supply duct 190. Disposed within main delivery duct 190 is an ultraviolet air purification system 200 to purify the air entering the structure and a selectively operable dehumidifier 202 to remove moisture from the air when such a condition is desirable, for example, in cold weather passing of air through the dehumidifier 202 would tend to raise the temperature of the air passing therethrough as the heat of vaporization of the water removed from the air would be imparted to the air. The main air delivery duct 190 branches into a peripheral air delivery duct 204 which circles the foundation of the building structure and which is positioned with respect to the building structure beneath the intermediate walkway 56 of the first tier 32. The top of the peripheral distribution line 204 includes a plurality of spaced arcuate slots 206 which allow the escape of air upwardly from the air supply duct to within the building.

Reference is now made to FIGS. 2 and 10 as well, where it is seen that a duct extension 208 is provided from each of the slots 206 in the air delivery duct 204. A winged air baffle 210 including a nodular lower extension 212 positioned centrally of the extension duct 208 is also provided in order to divert the flow of air coming from delivery duct 204 to each side of nodular extension 212. This air impinges on the lower portion of the winged extension members 214 and 216 to divert the flow of air outwardly from the air delivery duct 204. Thus, as seen in FIG. 2, by the indication of the arrows, the airflow is circulatory in two distinct circular patterns from the delivery system 204 upwardly through the open grillwork of each of the modular pens 44 to the central exhaust system 220 located at the top of the domed enclosure 22.

The exhaust system 220 is supported on platform 80 and is provided with bidirectional circulating fans 224 which, depending on the direction of rotation of the fans, can draw air out of the structure 22 to exhaust it, or can force the air back down into the structure to be recirculated again. The second condition is the more prevalent mode of operation during the winter as the air, once it has past through the building structure through each of the tiers, is warmed by the body heat of the swine and thus may be used to recover heat directly from the animals in order to assist in warming the building. Thus, in winter one fan may be operated to force a portion of the warmed air back into the structure. Also included in the exhaust system is an ozone purification system and dehumidifier 226 to eliminate orders and purify the air prior to its exhausting to the atmosphere. Thus, further dehumidification is obtained and objectionable odors are eliminated and from outside the enclosure 22 no offensive odors are discernible.

As a back up to the air pressurization system for flexible dome 22 and to prevent complete collapse of the dome in the event that the dome is ripped and pressure cannot be maintained to support the dome, stringers 230 and 232 are provided interconnecting the upper ends of vertical support members 90–92 and 86–88, respectively, (see FIGS. 1 and 2). Thus, vertical support member 92 is made slightly longer than vertical support member 90 so that stringer 230 connecting the two is inclined at an angle approximating the internal contour of dome 22. In this manner, vertical support member 88 is longer than vertical support members 86 so that stringer 232 is similarly disposed at an angle approximating the contour of dome 22 in the vicinity of stringer 232. Thus, should flexible dome 22 collapse for any reason, the stringers would provide sufficient internal support to prevent the dome covering from collapsing completely.

As noted above, a delivery system for the food supply to feed troughs 150 and a collection system for the animal waste from collection troughs 152, 154 and 156 are provided. Accordingly, vertically disposed overflow and collection lines 240 are provided which have an access opening at each tier level to troughs 152, 154 and 156. Reference is made to FIG. 4 which shows a preferred location for the collection lines 240, it being understood that this location is the same on each tier and that a greater or lesser number of lines may be provided. Lines 240 have approximate extensions to empty the collected waste into collecting trench 162.

Similarly, vertically disposed delivery lines 242 are provided which are connected to feed mix tanks 180 to deliver the slurry food supply at each tier level to the feed troughs 150. Also, overflow lines 244 are provided to return uneaten food back to tanks 180 where it is recirculated. A preferred disposition for these lines is illustrated in FIG. 5, it being understood that the location of lines 242 and 244 are common for all tiers and that a greater or lesser number of lines may be provided.

Thus, it is evident that a fully automated food delivery system and waste disposal system are provided which eliminate the necessity for manual distribution of food and removal of waste products.

Environmental control of the temperature and humidity of the air within the enclosure 22 is responsive to temperature and humidity sensors (not shown) placed at numerous strategic locations within the enclosure. These sensors are connected to a central control panel on the first tier which operates various control devices. It is evident that heaters and/or air conditioning units may be provided in the air supply duct 190 to condition the air in response to the sensed temperature of the air within enclosure 22. However, depending upon the severity of the weather conditions where structure 20 is erected, sufficient control may be obtained without requiring auxiliary conditioning units.

As described above, provision is made for recirculating a portion of the air which has passed upwardly to the exhaust opening 220 at the top of dome 22. The structure described herein has a capacity of 5,000 swine and, since, the normal surface body temperature of swine is 106° F., the animals themselves generate considerable heat. Hence, recovery of a portion of the heat generated by the animals in conjunction with the warming effect created by dehumidifying the air may provide sufficient heat to warm the internal temperature of the structure to a comfortable level in winter.

To cool the animals in summer, and also to provide a method to cleanse the animals and pens, an internal sprinkling system is provided which also acts as a fire sprinkling system. For this purpose, a water supply network comprising water lines 250 (see FIG. 8) rising vertically from a source of water under pressure adjacent vertical support members 90 is provided. Suitable spray nozzles (not shown) are provided at each tier level directed into the pens in inner ring 48 and outer ring 46. Thus, when the nozzles are opened in response to a temperature and/or humidity sensor, or because of high heat due to a fire, a water spray is emitted which has a cooling effect and which also cleanses the animals and the pens.

Additional cooling is obtained by providing a series of water spray lines 252 (see FIG. 1) outside the dome structure 22. Lines 252 are disposed to radiate outward from the top of dome 22 and are adapted to emit a very fine spray or mist to wet down the exterior of flexible member 22. Because the spray is a fine mist, it evaporates rapidly causing a cooling effect immediately adjacent the exterior skin surface of membrane 22 and this cooling of the surface of membrane 22 also provides a cooling effect to the air within the enclosure.

Additionally, because of the hemispherically shaped dome, the cooler air flows downwardly along, and close to, the exterior skin of the membrane to also cool the lower portion of the dome 22. Also, because the portion of the dome facing north would tend to be somewhat cooler than a portion of the dome facing any other compass direction, the air flowing downwardly adjacent the exterior skin surface on the northern exposure is even cooler. This is why it is preferable to place the air intake funnel 194 on the north side of the structure as the coolest air is now channeled into the main air supply duct 190.

It has been noted previously that on each tier there are provided one or more rectangular confinement pens 65, 68 and, desirably, one or more of these rectangular pens may be set aside as isolation pens to segregate any diseased animals. Accordingly, it may be desirable to prevent animals confined in these pens from eating from the general food supply, e.g., close off the outer portion of these pens so that animals within cannot reach the food circulating in the feed troughs. Additionally, the excrement from these animals should also be segregated and not returned to the collection trench 162. Accordingly, the waste from these pens would be diverted to an appropriate sewage disposal line or cesspool or may even by passed directly into the sand filter 184.

From the foregoing, it is evident that the present invention provides a fully automated, climatically controlled animal maintaining and feeding system with the capacity to house large numbers of animals within a confined area to greatly increase productivity in the raising of livestock for human consumption. Direct manual labor requirements are minimized as the present invention enables one man to successfully care for up to 5,000 animals in one confined enclosure. The animals' food is processed and delivered automatically, the feed is in the form of a liquid slurry which not only supplies all of the necessary nutritive elements but also the water requirements for the animals. Additionally, a fully automatic animal waste removal system is provided in conjunction with a waste-processing system to convert animal waste into a high-protein food supplement which is added to a corn and/or bean meal slurry. This provides a further cost reduction for feed costs as well as providing a sanitary system for disposal of animal waste.

Additionally, a controlled ambient environment is maintained through a ventilation system which circulates sterilized and conditioned air throughout the structure.

A central elevator system, backed up by ramp access to the major tiers of the structure, provides a simple means to transport animals from tier to tier and affords access to confinement pens on each tier and also affords a ready view of all of the pens to simplify observation and management of the animals within the structure. Movement of animals from pen to pen is minimal and ideally would be limited to no more than 50 animals a day. In practice, the younger animals would be placed in pens on the upper tier first and as they grew in size would be systematically shifted to pens on a lower tier. When shifted to a lower tier, the animals would first be placed in pens in the outer ring 46, as these pens are smaller in size than the pens in inner ring 48, and when they have grown in size the animals would be shifted to pens in inner ring 48 where they would remain until they reach market weight. The pens in inner ring 48 are also most accessible to the elevator and/or central walkway 58 and, hence, the large bulky animals ready for market would not be made to walk great distances in order to be readily removed. In addition, a carriage on tracks may also be provided through the air lock 26 and walkway 60 on the first tier to facilitate movement of the large bulky animals to and from the central elevator.

It is also noted that the structure has inherent structural integrity because of the assembly of the modular confinement pens so that they are supported in cantilever fashion. Also, providing a structure which in cross section closely approximates a circle adds to the structural integrity because bearing loads are distributed more uniformly over a greater number of the structural members.

While a preferred embodiment of the present invention has been specifically described herein, it is to be noted that various modifications can be made thereto without departing from the spirit and scope of the invention as defined in the appended claims.

What is claimed is:

1. A system for maintaining a feeding animals in a confined environment comprising:

a multitiered animal housing structure;

each said tier in said structure comprising a plurality of modular animal confinement pens arranged circumferentially about a central area and contiguous to each other;

means within said central area to afford access to said modular confinement pens immediately adjacent thereto;

said modular confinement pens including a flooring of an open mesh grillwork along the whole extent of each pen, said open mesh grillwork being sufficiently small to support an animal comfortably thereon while still allowing free passage of light and ventilation air therethrough;

each said pen further including trough means to collect animal waste products which fall through said open mesh grillwork of the flooring, said trough means being located under a portion of the flooring in each said pen, means associated with said trough means to flush said troughs to remove animal waste products to collect said waste products, and means to provide a supply of feed to animals confined in each said pen, said trough means in the pens in each said tier being in register whereby light and ventilation air may pass readily through the remainder of the open flooring of each said pen.

2. A system for maintaining and feeding animals in a confined environment comprising:

a multitiered animal housing structure;

each said tier in said structure comprising a plurality of modular animal confinement pens arranged circumferentially about a central area and contiguous to each other;

means within said central area to afford access to said modular confinement pens immediately adjacent thereto;

said modular confinement pens including a flooring of an open mesh grillwork along the whole extent of each pen, said open mesh grillwork being sufficiently small to support an animal comfortably thereon while still allowing free passage of light and ventilation air therethrough;

each said pen further including means extending under a portion of said flooring to collect and remove animal waste products which fall through said open mesh grillwork of the flooring;

means to provide a supply of feed to animals confined in each said pen;

a plurality of the lowermost tiers of said multitiered structure including an inner ring of trapezoidal-shaped modular confinement pens and an outer ring of trapezoidal-shaped confinement pens spaced radially outwardly from said inner ring;

each said plurality of lower tiers including an intermediate circumferential access walkway between said inner ring and outer ring of modular confinement pens to permit access to the interior of said confinement pens in said outer ring;

a radially extending access walkway from said central area to said intermediate circumferential access walkway to permit access to said outer ring of confinement pens from said central area; and at least the uppermost tier of said multitiered structure comprising only an inner ring of modular confinement pens with an access to said pens from said central area and whereby said structure in elevated cross section has a silhouette of a wider base portion tapering to a thinner top portion.

3. A structure as defined in claim 2 wherein each said tier is a polyhedron in plan whereby said modular confinement pens have a trapezoidal-shaped configuration in plan.

4. A structure as defined in claim 2 including a flexible, translucent dome enclosing said multitiered structure, said dome adapted to be supported by air pressurization from within and means operatively associated with said structure to provide sufficient air pressurization to support said flexible dome.

5. A structure as defined in claim 1 wherein radially disposed side floor support members are secured to each said flooring member on opposed radially disposed sides thereof, a plurality of spaced cross brace members interconnect said opposed side floor support members to provide a floor unit assembly comprising support framework fixed to the flooring member in each said modular confinement pen, thereby to permit light and ventilation air to pass readily through the major portion of the unsupported flooring member, a plurality of spaced upstanding support members disposed in a plurality of concentric rings about said central area, and said radially disposed side floor support members in each said floor unit assembly being fixed to adjacent ones of said upstanding support members with the modular confinement pens in each tier being in a common plane substantially perpendicular to said upstanding support members and vertically spaced from the pens on a tier immediately below.

6. A structure as defined in claim 5 wherein each said floor unit assembly has its opposed radially disposed sides fixed to at least two said upstanding support members in cantilever fashion with a radially inwardly disposed segment of said floor unit assembly overhanging the radially innermost pair of upstanding support members thereby to provide a structural unit having a maximum structural integrity and minimum auxiliary support bracing.

7. A structure as defined in claim 6 wherein adjacent modular confinement pens on the same tier are separated by radially disposed side partitions fixed to said upstanding support members at a height above said floor member sufficient to confine an animal therein, the outer perimeter of each modular confinement pen being closed by a partition spaced above said floor member to permit access to an animal's head and neck thereunder and fixed to upstanding stanchions secured to the floor unit assembly of each modular confinement pen, and the inner perimeter of each said modular confinement pen including a gate member adapted to pivot from a first position wherein the gate member completes an enclosure with said side partitions and said outer partition to a second position to allow access to said confinement pen.

8. A structure as defined in claim 1 wherein said means to provide a supply of feed to animals confined in each said modular confinement pen includes feed troughs adjacent the outer perimeter of each modular confinement pen and means within said structure adapted to distribute a slurrylike food mixture to said troughs on each said tier whereby animals confined within said modular confinement pens may feed from said feed troughs.

9. A structure as defined in claim 8 including collecting lines communicating with said troughs to return unused portions of said slurry mixture to said mixing tank to be recirculated to said feed troughs.

10. A structure as defined in claim 1 wherein said trough means to collect animal waste products associated with said first tier of said multitiered structure comprises an annular waste collection trench disposed beneath said first tier and wherein the animal waste products from animals confined on said first tier are flushed into said trench, and means to direct the animal waste products from the trough means on each of said upper tiers of said multitiered structure to said collection trench beneath said first tier.

11. A structure as defined in claim 10 wherein the trough means of adjacent confinement pens in a common tier in each of the upper tiers of said multitiered structure are interconnected to form an annular collection trough on each tier and said means to flush said troughs to remove animal waste products comprises a plurality of flush pipes disposed within each trough adapted to periodically emit a continuous stream of water, an annular overflow trough adjacent said collection troughs to receive the overflow of water carrying animal waste products and a plurality of circumferentially spaced collection lines communicating with said overflow trough on each said upper tier and with said collection trench to direct said water and animal waste products into said collection trench whereby animal waste products are automatically removed from said each animal confinement pen.

12. A structure as defined in claim 11 including means operatively associated with said waste collection trench to separate the major portion of the collected water from said mixture of animal waste and water and recirculate said recovered water through said flushing system for waste removal.

13. A structure as defined in claim 12 including means to process said separated animal waste products to promote bacterial and fungi action within said waste products thereby converting said waste products into micro-organisms having a high-protein content and useable as a protein food supplement for the animal feed and means to extract said micro-organisms and to add said micro-organisms to said mixing tank whereby said water and grain meal and said micro-organisms are mixed to form said slurry food mixture.

14. A structure as defined in claim 1 including a flexible dome-shaped membrane to completely enclose said multitiered structure, said dome-shaped structure adapted to be supported by air pressurization from within and means operatively associated with said structure to provide a supply of air under pressure within said membrane sufficient to support said dome-shaped membrane.

15. A structure as defined in claim 14 wherein said means to provide a supply of air includes an air supply duct having an outlet exterior of said membrane, fan means in said duct to draw air from without said structure, said supply duct communicating with an annular air delivery duct disposed below the first tier of said multitiered structure, air exit ports spaced about said air delivery duct to permit airflow from said delivery duct to said multitiered structure enclosed within said membrane and at least one air outlet port in said membrane located centrally therein and at an elevation above the uppermost tier of said multitiered structure whereby an air circulation path is provided for ventilation air upwardly through the open mesh grillwork of the floor members in each said confinement pen on each tier.

16. A structure as defined in claim 15 including selectively operable means to dehumidify air passing through said supply duct and means within said supply duct to purify air passing therethrough whereby ventilation air circulated within said membrane is climatically controlled and purified.

17. A structure as defined in claim 15 including means responsive to temperature and humidity sensors within said membrane to cool the air circulating within said membrane comprising a plurality of water supply lines operably connected to a source of water under pressure disposed within said structure having a plurality of spray nozzles operatively associated therewith, said nozzles being adapted to open to emit a water spray to each said modular confinement pen responsive to said temperature and humidity sensors thereby to cool the air circulating within said membrane as well as cleansing said structure and animals confined therein.

18. A structure as defined in claim 15 including means in said air outlet port in said membrane to deodorize and purify air exhausting therefrom.

19. A structure as defined in claim 15 wherein said dome-shaped membrane when erected and supported by air pressure from within is hemispherically shaped, a plurality of radiating water supply lines operatively connected to a source of water under pressure fixed to the exterior surface of said membrane, said water lines being adapted to emit a fine mist spray responsive to temperature conditions sensed within said membrane, whereby said fine spray mist evaporates rapidly thereby causing a cooling effect on the ambient air immediately adjacent the exterior of said membrane and cause a cooling effect which cools the air circulating within said membrane, said cooling effect also resulting in a flow of cool air downwardly from the apex of said membrane to the ground along the exterior surface thereof.

20. A structure as defined in claim 19 wherein said air supply duct outlet exterior said membrane is provided with an arcuate funnel to direct the flow of cool air flowing downwardly along the exterior surface of said membrane into said air supply duct, whereby air supplied to the interior of said membrane is cooler than the temperature of the ambient air outside the membrane.

* * * * *